June 28, 1932.                J. H. OSMER ET AL                 1,864,755
                    METHOD AND APPARATUS FOR TREATING OILS
                               Filed Aug. 13, 1928
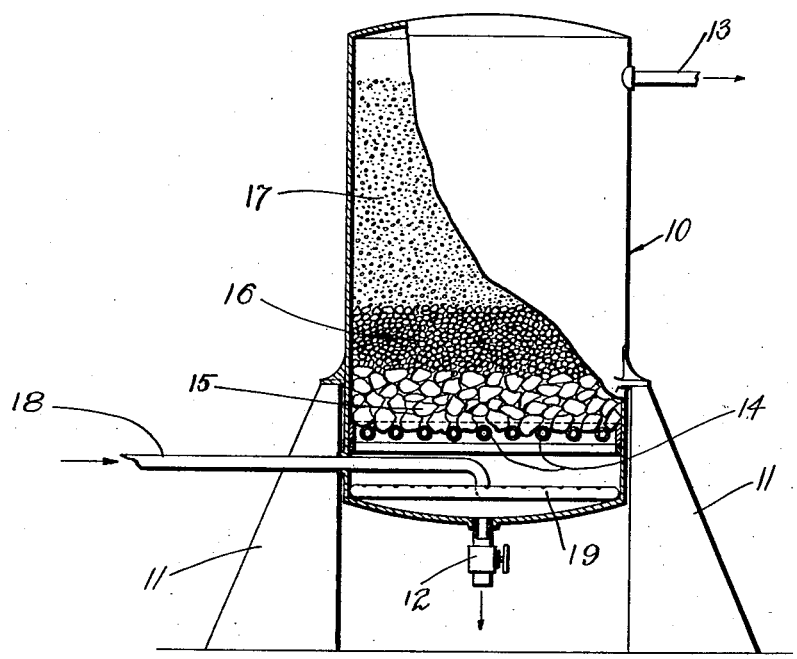
Inventors
James H. Osmer
Frederick L. Craise
By Lyon & Lyon
Attorneys Patented June 28, 1932

1,864,755

UNITED STATES PATENT OFFICE

JAMES H. OSMER, OF BERKELEY, AND FREDERICK L. CRAISE, OF EL SEGUNDO, CALIFORNIA, ASSIGNORS TO STANDARD OIL COMPANY OF CALIFORNIA, OF SAN FRANCISCO, CALIFORNIA, A CORPORATION OF DELAWARE

METHOD AND APPARATUS FOR TREATING OILS

Application filed August 13, 1928. Serial No. 299,282.

This invention relates to a new method of treating oils, particularly acid treated oils containing sludge or other acid reaction products. The method is particularly applicable to the treatment of petroleum distillates containing finely divided particles of sludge in suspension whereby the sludge is completely removed in a novel manner. The invention also relates to an apparatus by means of which the method may be carried out with great efficiency and rapidity.

In the refining of petroleum oils such as motor fuel, lamp oils or lubricating oils, it is necessary to treat the oil with some agent or agents adapted to remove resinous matter, sulfur compounds, coloring matter and the like. The agent which is ordinarily employed is sulfuric acid. The requisite acid is contacted with the oil, such contact being made in a variety of ways; for example, it may be effected by mechanical agitation or by blowing air through a body of oil and acid.

The action of the acid upon the impurities contained in the oil results in production of a relatively viscous "sludge" which is substantially insoluble in the oil and which is highly acidic. This sludge is distributed throughout the body of oil in the form of drops of varying size. The finished oil must of course be neutral and therefore the next step following the contacting of acid with oil is directed toward removing all the suspended sludge from the treated oil. In addition to the acidity of such oil which is due to sludge, there is dissolved in the oil a greater or lesser amount of $SO_2$ and reaction products which contribute to the acidity of the oil and must be removed. Inasmuch as the specific gravity of the sludge is considerably higher than that of the oil, separation of the two fluids by gravity settlement takes place more or less readily upon discontinuance of the agitation. In this way the greater portion of the acid sludge may be quickly separated and removed without difficulty. It is the almost universal practice at present to follow the acid contacting step with a period of relative quiescence so as to settle out as much sludge as possible.

However, it is virtually impossible to remove all of the sludge by gravity settlement due to the fact that the agitation during contact of oil with acid causes the formation of a great number of extremely small particles of sludge which are dispersed throughout the body of the oil and settle very slowly, so slowly, in fact, that it is impossible in any commercial operation to allow time for complete clarification. For example, we have found that a sample of acid treated gasoline had a total acidity of 414 (arbitrary measure) due to sludge and dissolved $SO_2$ immediately after leaving the treater. The design of this treater was such that it afforded some time for settlement so that all of the extremely large drops of sludge were removed therein and the acidity of 414 represented only that sludge which did not immediately settle. After standing completely undisturbed for one hour this sample of oil had an acidity of 74 (on the same scale), and after two hours the acidity was 6 and still decreasing. The acidity due to dissolved $SO_2$ and reaction products and permanently suspended sludge was, on this scale, about 1, which point was reached in about twelve hours. It is noteworthy that these comparative figures indicate the results obtainable under ideal conditions for settlement, (i. e. the oil is at perfect rest), whereas in practice this condition could not be realized. Furthermore, these measurements were taken on samples only 12 inches deep, and therefore illustrate the settlement occurring in that depth, corresponding to the top 12 inches only in a settling tank of commercial size. Although the quantity of sludge and other reaction products remaining in suspension in the oil after settlement is small in comparison with the total amount of sludge produced, nevertheless it is an important factor in the subsequent treatment of the oil.

Both the sludge and the dissolved $SO_2$ may be eliminated by washing the oil with an alkaline solution. However, it would be wasteful to apply a neutralizing agent at once to an oil containing a considerable amount of sludge. In general the practice has been to first settle out and withdraw as much of the sludge as possible and then to wash the oil with water in order to remove most of the remaining small particles of sludge before applying the alkaline wash.

The principal objection to this procedure lies in the fact that the action of water or an aqueous solution upon sludge in the presence of oil causes the re-solution in the oil of part of the coloring matter and other impurities contained in the sludge. The result is apparent at once in a considerable darkening of the color of the oil. This means, of course, that a subsequent decolorizing operation must be resorted to or increased substantially, or that the prior acid treatment must be increased, or that both of these measures must be employed.

Another objection to water washing sludge-containing oil is the highly corrosive action of the weak acid solution thus formed.

It is therefore very desirable to find a method for completely removing the fine suspended sludge particles without the use of water or aqueous solutions. It has been proposed to accomplish this by contacting the acid oil with adsorbent clay, diatomaceos earth or other porous mineral adsorbent material. However, this method is not entirely satisfactory, principally because of the difficulty in disposing of the mixture of adsorbent and sludge and also because of the considerable quantity of adsorbent required for complete clarification.

In addition to the above method of treating oil for the removal of suspended sludge, attempts have been made to filter the oil so as to remove the suspended sludge particles mechanically. Such filtration has been accomplished by forcing the oil through beds of fine sand or through other pervious bodies such as canvas, clay beds and the like. In these filtering operations the filter bed or filter cloth is rapidly clogged by the fine drops of rather viscous sludge so that a continuous process can not be employed. Furthermore, the filtering surfaces must be such that they will not be attacked by the acid sludge. Filtration, therefore, has been abandoned in most cases in view of the fact that it can only be carried on until the voids of the filtering medium are clogged by the sludge when it becomes necessary to shut down and either dispose of the filter bed or restore it for further use by removing the fine sludge. The suggestion has been made to remove sludge from the filter bed by washing it with water and so dissolving and carrying away the sludge. This is successful, to some extent at least, insofar as the sludge removal is concerned, but it leaves the bed permeated with water and hence unsuitable for use before drying. The drying operation (by steam or hot air or the like) is costly and slow. The interruption of the operation to restore the filter bed not only requires labor at frequent intervals, but also results in the loss of good petroleum oil by retention in the filtering medium and necessitates the use of apparatus of large capacity.

We have discovered that complete sludge removal may be realized in a continuous process without the disadvantages inherent in previously proposed processes. By means of our process a complete removal of the sludge is attained so that a subsequent water washing step may be eliminated or, if used, will not cause a reversal of the color of the petroleum oil. The operation, carried out in accordance with this invention, may be continuous and does not require the intermittent cleaning or rechanging operations encountered in filtration work.

An object of this invention is to provide a process of removing finely divided suspended sludge from petroleum oils in a continuous manner. Another object is to provide a process whereby a complete removal of finely divided acid sludge from petroleum oils may be accomplished by coalescing the sludge on the surfaces of a solid material.

Another object is to provide a continuous process of removing suspended sludge from petroleum oils which will eliminate the need of washing the oil with water.

Another object is to provide an apparatus whereby finely divided sludge suspended in petroleum oils may be removed therefrom in a continuous manner.

A still further object of this invention is to provide an apparatus wherein sludge suspended in a petroleum oil may be gathered by coalescence upon solid surfaces and removed separately from the oil.

Other objects, uses and advantages of our invention will become apparent from the following detailed description of our process and apparatus as applied to the treatment of petroleum distillates such as gasoline or kerosene containing finely divided suspended sludge. The treatment of such distillates is given in detail merely for purposes of illustration, it being understood that the invention is not limited to the treatment of these distillates but is applicable to all oils containing a finely divided sludge or other acid reaction products of greater specific gravity than the oil.

Briefly, our process consists in passing the sludge-in-oil suspension in contact with surfaces of a solid insoluble in the oil and inert to the acid, which solid is capable of being wetted by the sludge. The sludge particles adhere to the solid and the clear oil passes on. One of the prime requirements is, of course, that all of the sludge particles be given the opportunity of contacting with the solid. One way of providing for this (and that described in detail in our preferred embodiment below) is to cause the oil to pass through a loosely packed bed of suitable solid material. The pore spaces or voids between the solid material forming the bed should be sufficiently large, however, so as to enable the action to be carried out in a continuous manner. Generally described, our process comprises passing an oil containing suspended particles of sludge upwardly through a graded bed of rock and gravel, the voids in the bed being of such size that they will not become clogged by solid particles in the oil and sludge and also that a film of sludge cannot extend across them and so stop the flow of oil therethrough. The velocity of oil flow should be such that it will not prevent the flow of sludge in an opposed direction.

When an oil containing suspended sludge is passed through a bed such as has been described above in accordance with one form of our invention, the sludge will coalesce upon the solid surfaces of the bed and the sludge free oil will be discharged from the upper portion of the bed. After a considerable thickness of coalesced sludge has formed on the surfaces of the solid material, the sludge will drain off and flow downwardly in a direction substantially counter-current to the flow of the oil. In this manner, sludge may be removed from petroleum oils in a continuous manner and a substantially sludge free oil and oil free sludge discharged separately.

One form of apparatus which may be used in carrying out our process is shown on the attached drawing, it being understood that the invention is not limited to this particular form of apparatus but embraces various modifications thereof.

In the preferred form of apparatus shown in the drawing the treater consists of a vertical cylinder or tank 10 suitably supported as by means of the foundations 11. A valved outlet 12 is provided in a lower portion or bottom of the tank 10 and a suitable outlet 13 is provided near the top of the tank 10. The interior of the tank 10 may be substantially completely filled with a graded bed of solid material. As shown in the drawing, the bed may be supported within the tank 10 by means of a grille of pipes or rods 14, horizontally disposed within the tank 10 near the bottom thereof. These rods or pipes 14 support a suitable bed of coalescing surfaces, for example, a bed of large gravel 15 or other solid material in rather large form may be supported directly upon the rods 14. Above the large gravel 15 a bed of smaller sized gravel 16 may be placed on this may be surmounted by a bed of even finer crushed rock or gravel 17.

An inlet pipe 18 is provided leading into the bottom of the tank 10, the inlet pipe 18 terminating in a suitable distributing head 19 adapted to avoid high velocities and high back pressure. It is not essential that a distributing means be used. The packing material will itself tend to cause uniform distribution of the oil flow.

The packing materials 15, 16, 17 and the like may consist of gravel or any other silicious composition such as porcelain, ceramic bodies, or in fact any solid material which is preferentially wetted by sludge, and is insoluble in oil or acid.

The use of a graded bed consisting of superimposed layers of packing materials of increasing fineness is optional. However, the use of graded packing as shown is desirable for several reasons. One is that it offers a convenient method of supporting the finer material. Another is that the coarser packing removes the larger sludge particles while having a minimum tendency to clog up. If desired, one single layer of pea gravel or other suitable packing material may be employed. In all instances, however, it is essential that the packing be of such size and shape that the voids between the packing material are of greater size than the space normally occupied by sludge adhering to the surfaces of the packing material. We have found that pea gravel having the following screen analysis is suitable for use in the process as described when motor gasoline is being clarified:

| | Per cent |
|---|---|
| On ¾″ screen | 2.0 |
| On ½″ screen | 5.8 |
| On ¼″ screen | 36.6 |
| On 10-mesh screen | 40.9 |
| On 20-mesh screen | 13.2 |
| Through 20-mesh screen | 1.5 |

When an oil containing suspended sludge is introduced into an apparatus such as is shown in the drawings through the inlet pipe 18 and is distributed over the cross sectional area of the tank 10 by means of the distribution pipe 19 the oil and sludge rises upwardly through the bed of packing material above the supports 14.

The valved outlet 12 is ordinarily closed during the beginning of an operation of this character. The sludge contained in the oil comes in contact with the packing materials 15, 16 and 17 and is removed from the oil by adherence thereto. The oil being cleaned flows upwardly and is discharged continuously through the outlet 13.

After this operation has been carried on for an extended period of time, the coating of the sludge upon the packing materials becomes fairly thick and this sludge coalesces into large drops which drain off the packing material downwardly, that is, countercurrent to the flow of the oil. The relatively high specific gravity of the sludge in comparison with that of the oil allows this action to take place. As the sludge travels downwardly it automatically removes excess quantities of sludge adhering to the packing in the lower sections of the treater until eventually large drops or streams of sludge find their way into the bottom of the treater 10. The valved outlet 12 is then opened and the sludge discharged. The outlet 12 may be maintained thereafter in such open position as to enable the coalesced sludge to discharge continuously without allowing any free oil to be discharged simultaneously.

Prior settlement of coarse sludge is unnecessary when operating an apparatus as described, that is, when the oil passes first through a section of the bed filled with relatively coarse packing material.

We have at times used a horizontal instead of a vertical vessel for containing the contact bed. In this case the oil flow was horizontal while the coagulated sludge flow was perpendicular to the oil flow; i. e., vertically downward. Neither the shape nor the size of the bed is of first importance providing it provides opportunity for the requisite amount of contacting and permits the sludge to drain off.

The pea gravel which we described as being suitable for use with gasoline is only one of many materials which might be used. Coarse sand such as blast sand has been used with good results. In one case we used a treater packed with graded rock in which a stratum of pea gravel was surmounted with a stratum of blast sand having the following screen analysis:

|  | Per cent |
|---|---|
| On 10-mesh screen | 50 |
| On 20-mesh screen | 42 |
| Through 20-mesh screen | 8 |

As throwing further light on the subject of packing size it may be remarked that we have found ½" to ¾" rock to be only about one-third as efficient for sludge removal as the following rock known as "No. 4 rock":

|  | Per cent |
|---|---|
| On ½" screen | 10.8 |
| On ¼" screen | 68.2 |
| On 10-mesh screen | 19.4 |
| Through 10-mesh screen | 1.6 |

Although, in general, finely divided packing material is more efficient as a coagulator than coarse material, weight for weight, nevertheless there is a practical limit to the fineness which may be used. This limit is set primarily by the tendency of fine material to pack and its ability to retain sludge, either or both of which would interfere with the flow of oil through the bed and so prevent continuous operation.

It has been observed that crushed rock is sometimes decomposed more or less by long exposure to the action of sludge. For this reason we prefer to use rock having weathered surfaces whenever possible.

It will be obvious that the size and amount of packing material suitable in any case will depend among other things, upon the kind of oil processed, the rate of flow desired and the distribution of particle size of the sludge. We have found that it is best to keep the velocity of oil flow below the point at which it would tend to tear sludge off the solid surfaces on which it is coalesced. Such action would cause sludge to be carried along with the oil and by breaking up sludge which was already coalesced would in a measure defeat the purpose of our invention. For the same reason we prefer to operate our process in such a way that the solid coagulating material remains in place and is not agitated by the oil flow. Similarly we have found that it is undesirable to permit the coagulator to become filled or flooded with sludge, as by allowing the sludge level to rise into or over the bed. Under these conditions the effect is the same as if the oil velocity were too high, i. e. sludge will not drain back as fast as it accumulates, hence more or less sludge is swept along with the oil.

An idea of the results obtained by our method may be had from the following figures which represent the results of an actual and typical operation. Motor gasoline, after vigorous agitation with sulfuric acid and brief settlement of very coarse sludge (incident to the particular treater design used), was passed through a vertical coagulator at the rate of 600 bbls. (50 gal.) per hour. This coagulator was a cylindrical vessel 10 ft. in diameter. The oil entered near the bottom and passed upwards through a bed of graded rock and out the top of the vessel. The oil thus passed through approximately the following quantities of packing in the order named:

| | |
|---|---|
| 1 ft.—6"–12" cobblestones | |
| 2 ft.—#1 rock | function = removal of coarser sludge, distribution of oil, support |
| 2 ft.—#2 rock | |
| 2 ft.—#3 rock | |
| 8 ft.—#4 rock | |
| 8 ft.—Special pea gravel | function = coagulation of fine sludge particles |
| 2 ft.—Blast sand | |

The oil entering the coagulator was dark, cloudy, red or reddish-brown in appearance due to suspended sludge particles. Its acidity was 414 on the arbitrary scale mentioned above. The same oil as it emerged from the coagulator was perfectly clear to the eye, colorless and had an acidity of about 2 on the same scale, i. e. the acidity was reduced more than 99.5%. To reduce the acidity of a sample of the same oil only 12 inches deep an equal amount by gravity settlement alone required 9 to 10 hours of motionless settling. The remaining acidity of 2 units is believed to be mostly due to dissolved $SO_2$. At any rate it may be eliminated by water washing or by washing with a dilute solution of an alkali or both. We prefer to use only the latter. Neither water nor alkali so used had any deleterious effect on the color or quality of the oil. The interfacial scum which formerly accumulated in the water wash and alkali wash treaters was almost entirely eliminated. The sludge draining out of the coagulator was withdrawn semi-continuously and was found to be substantially oil-free. No limit has been found for the length of time these coagulators can be operated without cleaning or repair. We have used the process as above described at a continuous oil rate of 600 bbls. per hour for upwards of six months with no decrease in efficiency.

In treating lamp oils by our process we use practically the same method. For example, when removing sludge from hot-treated kerosene, the hot oil was passed directly without prior settling into the lower part of a vertical vessel 6 ft. in diameter packed with graded rock including 8 ft. of special pea gravel. The oil rates used varied from 100 to 200 bbls. per hour. In this way approximately 95% of the sludge was removed. Of the acidity remaining in the oil after this treatment at least 75% was attributable to dissolved $SO_2$.

We have used the process as above described for batch as well as continuous treatments, and for removing sludge from lubricating distillates as well as from light oils. When treating lubricating or any heavy oils it is sometimes of advantage to pre-coat the coagulating surfaces with sludge before passing the oil through.

One of the principal advantages attained by the use of our process is the reduction of treating acid requirement. This results from the avoidance of quality reversion due to contacting oil, sludge and water.

The invention described hereinabove, therefore, consists in establishing and maintaining a bed of packing material composed of substances preferentially wetted with sludge or other acid reaction products, the voids or pore spaces within such bed of packing material being of such size as not to allow films of sludge coagulated upon the surfaces of adjoining particles from completely filling the space therebetween and in maintaining a flow of oil containing suspended sludge through such bed at a velocity insufficient to counteract the flow of coagulated sludge in a direction substantially opposed to the flow of oil, and preferably at a velocity insufficient to disturb the bed of packing material. This process thereby results in the continuous and complete separation of sludge from an oil, the sludge being discharged separately from the apparatus. Numerous changes and modifications may be made in the construction and arrangement of the apparatus and in the process, all such changes and modifications being embraced in the following claims.

We claim:

1. A continuous process of removing finely divided suspended sludge from petroleum oils comprising, forming a porous bed of solid non-absorbent insoluble material capable of being preferentially wetted by the sludge, the pores formed in such bed being of sufficient size to prevent sludge films of sufficient size to prevent sludge films formed on the surfaces of the insoluble material from completely filling such pores, passing an oil containing suspended sludge upwardly through such porous bed, coagulating the sludge upon the surfaces of such bed, discharging sludge-free oil from an upper portion of such bed and allowing sludge coagulated upon the solid surfaces to flow downwardly through such bed.

2. A process of separating sludge from petroleum oils comprising, forming a porous bed of solid non-absorbent insoluble material of such character as to be preferentially wetted by sludge but containing voids of sufficient size to prevent clogging thereby and continuously passing an oil containing suspended sludge upwardly through such bed of material at a velocity insufficient to counteract a simultaneous downward flow of coagulated sludge through said bed of material.

3. A process of separating petroleum oils from sludge suspended therein, comprising continuously passing an oil containing suspended sludge through a porous bed of solid non-absorbent surfaces adapted to coagulate the suspended sludge particles under conditions of oil flow insufficient to carry off the coagulated sludge together with the oil and insufficient to prevent a substantially countercurrent flow of coagulated sludge through such bed.

4. An apparatus for separating suspended liquid sludge particles from petroleums comprising, a chamber, a packing bed of solid non-absorbent material within said chamber containing voids of sufficient size to prevent clogging by suspended sludge particles under operating conditions of oil flow therethrough, a sludge outlet from the lower portion of said chamber, an oil outlet from the upper portion of said chamber and an inlet for oil containing suspended sludge leading into said chamber vertically between said oil and sludge outlets.

5. An apparatus for separating petroleum oils from sludge suspended therein comprising, a chamber, an oil outlet from the upper portion of said chamber, a sludge outlet from the lower portion of said chamber, a packing bed of solid non-absorbent particles of material within said chamber, said particles of packing material being of various sizes adapted to be preferentially wetted by sludge and adapted to form a bed containing voids of sufficient size to prevent clogging by coagulated sludge particles, and an inlet for oil containing suspended sludge particles in the lower portion of said chamber but above said sludge outlet.

6. An apparatus for separating suspended sludge particles from petroleum oils in a continuous manner comprising a chamber, an oil outlet from the upper portion of said chamber, a separate sludge outlet from the lower portion of said chamber, a graded bed of packing material within said chamber, said packing material being adapted to be preferentially wetted by sludge and containing voids of sufficient size to prevent clogging by suspended sludge particles under operating conditions of liquid flow therethrough and a separate inlet for oil containing suspended sludge particles in the lower portion of said chamber but above said sludge outlet.

7. An apparatus for separating petroleum oils from sludge suspended therein, comprising a chamber, an oil outlet from the upper portion of said chamber, a sludge outlet from the lower portion of said chamber, a bed of solid non-absorbent packing material containing less than about 10% of particles passing through twenty mesh and consisting essentially of ten mesh and coarser particles of such size and in such proportion as to form voids in said bed of sufficient size to prevent clogging by coagulated sludge particles, and an inlet for oil containing suspended sludge particles in the lower portion of said chamber but above said sludge outlet.

8. A process of separating sludge from petroleum oils, comprising forming a porous bed of solid, non-absorbent material adapted to be preferentially wetted by sludge, said bed containing less than about 10% of particles passing through 20 mesh, and consisting essentially of 10 mesh and coarser particles of such size and in such proportion as to form voids in said bed of sufficient size to prevent clogging thereof by coagulated sludge particles, and continuously passing an oil containing suspended sludge upwardly through such bed of material at a velocity not sufficient to counteract a simultaneous downward flow of coagulated sludge through said bed of material.

Signed at San Francisco, Calif., by JAMES H. OSMER, this 26th day of July, 1928.

Signed at El Segundo, Calif., by FREDERICK L. CRAISE, this 28th day of July, 1928.

JAMES H. OSMER.
FREDERICK L. CRAISE.

CERTIFICATE OF CORRECTION.

Patent No. 1,864,755. June 28, 1932.

JAMES H. OSMER ET AL.

It is hereby certified that error appears in the printed specification of the above numbered patent requiring correction as follows: Page 5, line 106, claim 4, strike out the word "packing" and insert the same before "material" in line 107; and line 121, claim 5, strike out the word "packing" and insert the same before the syllable "mate-" in line 122; and that the said Letters Patent should be read with these corrections therein that the same may conform to the record of the case in the Patent Office.

Signed and sealed this 29th day of November A. D. 1932.

(Seal)

M. J. Moore,
Acting Commissioner of Patents.